United States Patent
LoRay

(10) Patent No.: US 11,884,142 B1
(45) Date of Patent: Jan. 30, 2024

(54) PROTECTIVE TIRE DEVICE

(71) Applicant: Dwight LoRay, Parrish, FL (US)

(72) Inventor: Dwight LoRay, Parrish, FL (US)

( * ) Notice: Subject to any disclaimer, the term of this patent is extended or adjusted under 35 U.S.C. 154(b) by 428 days.

(21) Appl. No.: 17/317,973

(22) Filed: May 12, 2021

(51) Int. Cl.
*B60J 11/10* (2006.01)

(52) U.S. Cl.
CPC ..................... *B60J 11/10* (2013.01)

(58) Field of Classification Search
CPC .................. B60J 11/10; B60J 11/00
USPC ..... 280/79.4; 296/83; 206/304, 304.1, 304.2
See application file for complete search history.

(56) References Cited

U.S. PATENT DOCUMENTS

| | | | |
|---|---|---|---|
| 1,510,159 A | 9/1924 | Powell | |
| 2,348,084 A * | 5/1944 | Macchesney | B65D 85/06 206/304 |
| 3,876,069 A * | 4/1975 | Studen | B65D 85/06 206/304 |
| 4,126,169 A * | 11/1978 | Magnuson | B62D 43/005 206/304.1 |
| 6,789,352 B2 * | 9/2004 | Price | A01M 1/2016 43/132.1 |
| 9,988,183 B2 | 6/2018 | Ikeguchi | |
| 2005/0091911 A1 * | 5/2005 | Matts | A01M 1/026 43/131 |
| 2007/0113491 A1 * | 5/2007 | Royals | E02D 5/74 52/161 |
| 2009/0288980 A1 * | 11/2009 | Hadala | B65D 71/0096 206/597 |
| 2016/0068032 A1 * | 3/2016 | Kritzell | B60C 19/125 29/894.37 |

FOREIGN PATENT DOCUMENTS

| | | | |
|---|---|---|---|
| JP | 2010089560 A | * | 4/2010 |
| JP | 6304521 B1 | * | 4/2018 |
| KR | 101402699 B1 | * | 6/2014 |

OTHER PUBLICATIONS

KR101402699B1 translation. (Year: 2023).*
JP 2010089560A translation. (Year: 2023).*

* cited by examiner

*Primary Examiner* — John K Fristoe, Jr.
*Assistant Examiner* — Justin Caudill
(74) *Attorney, Agent, or Firm* — Sanchelima & Associates, P.A.; Christian Sanchelima; Jesus Sanchelima

(57) ABSTRACT

A system for a protective tire device including a cover assembly, strap assembly and a tire assembly is disclosed. The cover assembly includes a dome cover. The dome cover includes through holes reinforced with O-rings located equidistantly about a circumference of the dome cover. Each through hole receives one of a plurality of elastomeric straps having a hook at a distal end thereof. The dome cover is mounted over a tire sitting atop a tire stack. The elastomeric straps extend downwardly along the tire stack. The hooks of the elastomeric straps are extended towards a center of the tire stack such that the elastomeric straps are sandwiched between two tires of the tire stack. The hooks engage an inner liner of the tire from underneath, creating tension on the elastomeric straps and securing the dome cover to the tire to prevent access to the interior of the tire stack.

9 Claims, 4 Drawing Sheets

PROTECTIVE TIRE DEVICE

BACKGROUND OF THE INVENTION

1. Field of the Invention

The present invention relates to a protective tire device, more particularly, to a protective tire device that helps to shield the interior of stacked tires to prevent deterioration of the tires due to exposure to harsh outdoor weather conditions.

2. Description of the Related Art

Several designs for protective tire devices have been designed in the past. None of them, however, include a cover for a tire stack comprising a plastic dome having a plurality of O-rings, and elastomeric straps mounted equidistantly around the circumference of the dome.

Applicant believes that a related reference corresponds to U.S. Pat. No. 9,988,183 for a tire and wheel transportation device that covers and secures stacks of tires. Applicant believes that another related reference refers to U.S. Pat. No. 1,510,159 for a means for packing, covering and protecting stacked tires. None of these references, however, teach of a dome shaped cover using elastomeric straps to secure the cover over a tire atop of a tire stack to shield and prevent access to the interior of the stacked tire to preserve and protect the tires from harsh weather conditions.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a protective tire device that helps to prevent access to an interior of stacked tires.

It is another object of this invention to provide a protective tire device that helps to prevent the deterioration of tires due to the exposure to harsh weather elements.

It is still another object of the present invention to provide a protective tire device that helps to prevent breeding of insects within the interior of the stacked tires.

It is also an object of the present invention to provide a protective tire device that is portable and reusable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
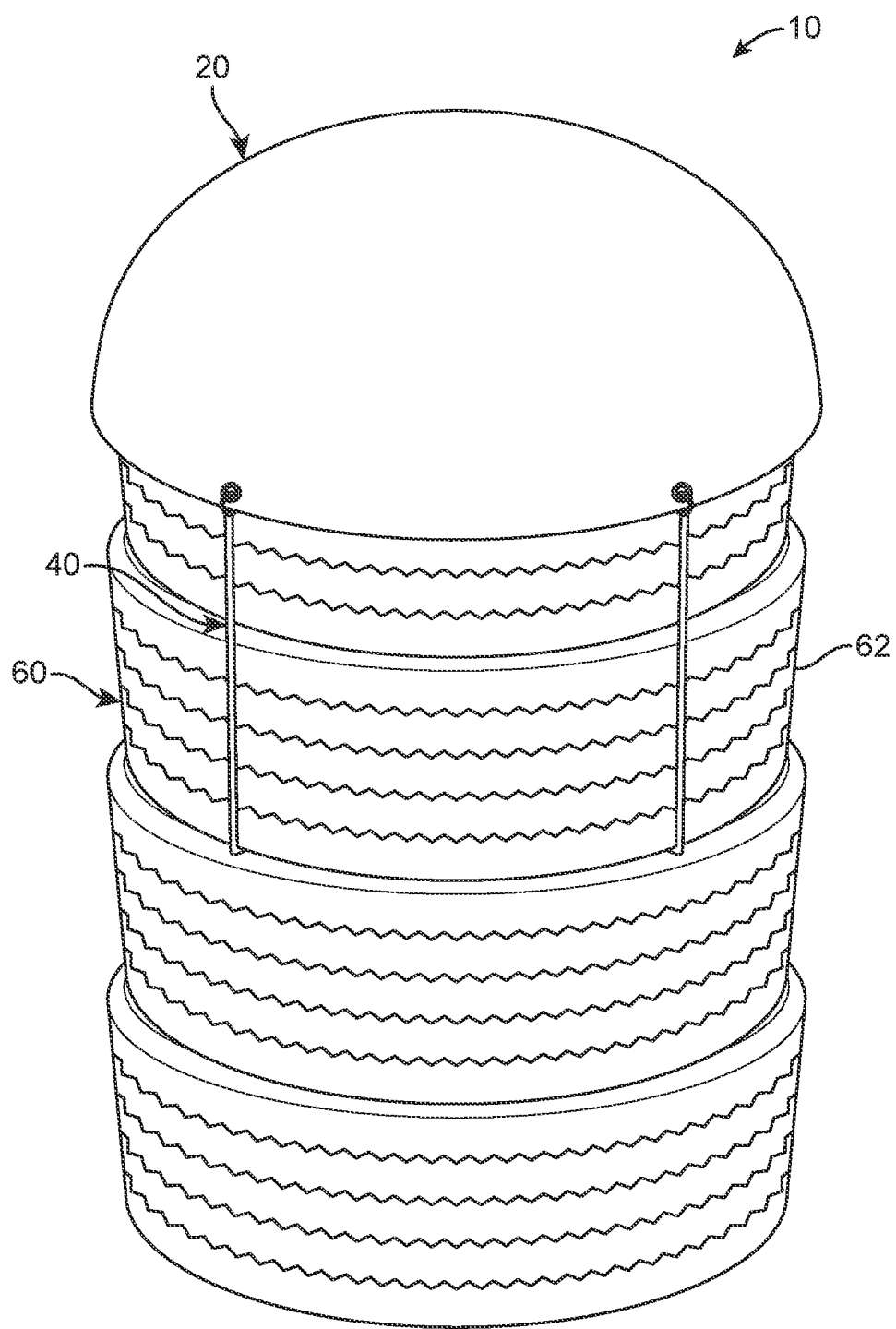
FIG. 1 represents an operational setting of protective tire device 10 secured to a tire 62 atop of a stack of tires.

Referring now to the drawings, where the present invention is generally referred to with numeral 10, it can be observed that it basically includes a cover assembly 20, a strap assembly 40 and a tire assembly 60.

Tires for vehicles are constantly replaced which means there tends to be an abundant supply of tires ready to be mounted onto vehicles. During storage, tires are typically stacked atop of one another. Most often the stacked tires are kept outdoors in harsh weather conditions. This causes the interior of the stacked tires to become wet with snow or rain. This causes the tires to deteriorate over time before they can be used. Additionally, the wet interior of the tires often becomes ideal breeding grounds for bugs and the like. The bugs damage the tires in numerous ways. Access to the interior of stacked tires proves to be detrimental to maintaining the tires in proper condition for usage. Protective tire device 10 may help to eliminate this concern, by blocking access to the interior of stacked tires in any indoor or outdoor conditions, as best illustrated in FIG. 1. Thereby, helping to maintain the tires clean and properly conditioned for usage.

Figure 2:
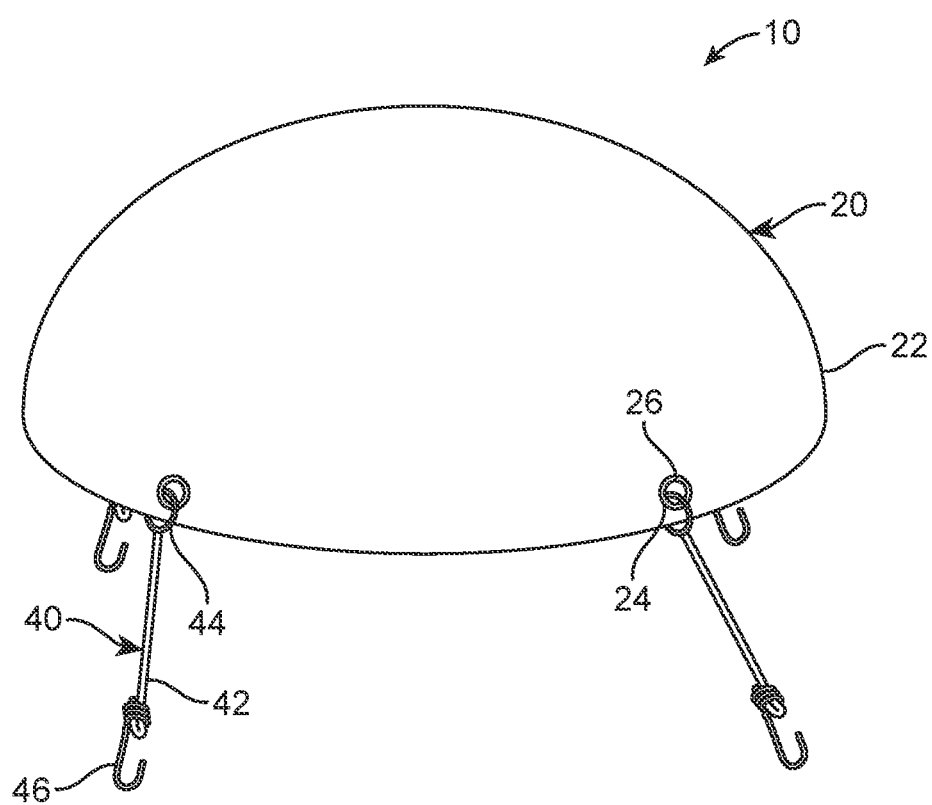
FIG. 2 shows an isometric view of protective tire device 10.

Cover assembly 20, as best seen in FIG. 2, may include a cover 22. Cover 22 may preferably be dome shaped and hollow. It is to be understood that cover 22 may be made of materials such as plastic, rubber, wood, aluminum, or the like. It may be suitable for cover 22 to have a smooth exterior, in one implementation. In one embodiment, it may be suitable for the exterior of cover 22 to be customized with logos and designs as desired.

Extending about the base circumference of cover 22 may be a plurality of through holes 24. Through holes 24 may be equidistantly located about cover 22. Preferably, through holes 24 may have a circular configuration. Each of through holes 24 may include one of a plurality of O-rings 26 within. O-rings 26 may be of a shape that cooperates with through holes 24 and extend about an inner perimeter of through holes 24. O-rings 26 may help to reinforce through holes 24 for added durability. O-rings 26 may be made of durable materials such as aluminum or metal.

Figure 3:
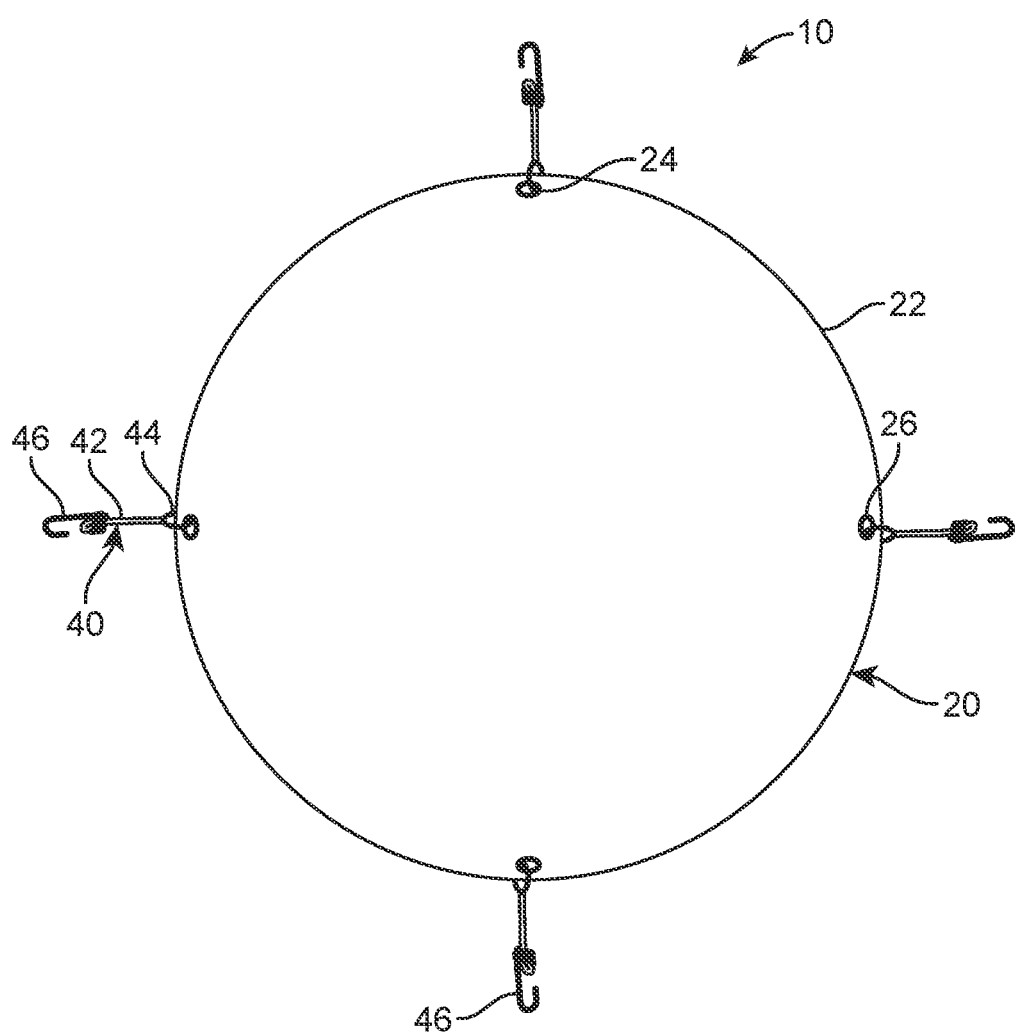
FIG. 3 illustrates a top view of protective tire device 10.
Figure 4:
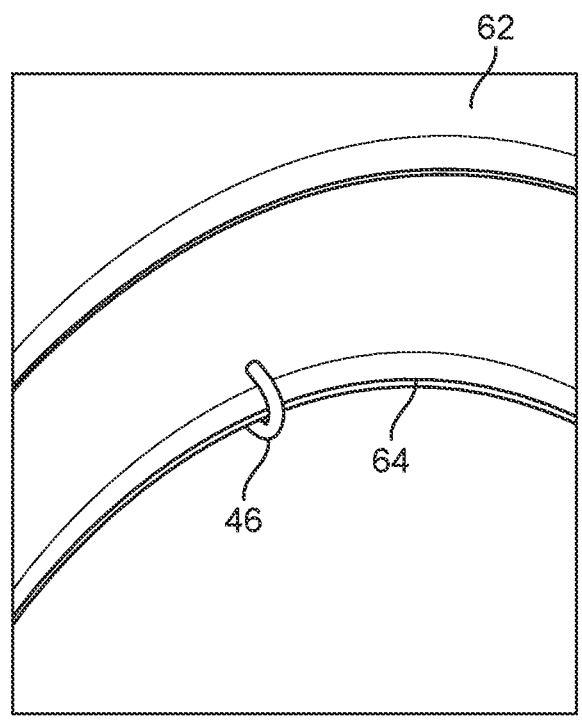
FIG. 4 depicts a zoomed in view showing the manner in which the strap assembly 40 engages an inner liner 64 of a tire 62 to secure cover assembly 20 to the tire 62.

Secured to each of through holes 24 may be strap assembly 40, as best depicted in FIGS. 2-3. More specifically, strap assembly 40 may include straps 42, with one of straps 42 secured to each of through holes 24. As such, straps 42 may be equidistantly spaced apart about the circumference of the base of cover 22. Most preferably, straps 42 may be elastomeric straps. Thereby, allowing straps 42 to expand as needed.

Straps 42 may each include a securing loop 44 at a top end and a hook 46 at bottom end thereof, as best demonstrated in FIGS. 2-3. Securing loop 44 may hang from each of through holes 24. It may be suitable for securing loop 44 to partially extend about the perimeter of each of through holes 24. Subsequently, securing loop 44 may partially conceal each of O-rings 26 when secured to through holes 24. Each of O-rings 26 may be in constant abutting contact with securing loop 44. In one embodiment, securing loop 44 may be removably secured to each of through holes 24. Straps 42 may be integral with securing loop 44, in one implementation.

At the bottom distal end of each of straps 42 may be located hook 46. Hook 46 may assist each of straps 42 to be removably attached to tire 62. Thus, cover 22 may be detachably secured to tire 62. Hook 46 may extend towards an inner portion of tire 62 from the outside such that straps 42 are in constant abutting contact with the outside of the stacked tires. Hook 46 may then engage inner liner 64 of tire 62 from underneath and create tension on straps 42. Thereby resulting in protective tire device 10 being secured properly to prevent access to the interior of the tires stacked and partially covered. Straps 42 may be sandwiched between two tires of the stack while hook 46 engages inner liner 64. Inner liner 64 may be located about the entire inner circumference of tire 62. In one embodiment, hook 46 may include a top portion which partially ravels about the circumference of straps 42. Hook 46 may preferably extend downwardly and curve towards securing loop 44 at a distal end thereof.

Protective tire device 10 may be secured to tire 62 atop of a stack of tires 63 being stored. Cover 22 may be mounted over tire 62 such that tire 62 may be at least partially concealed. Cover 22 may have a width greater than that of tire 62. Protective tire device 10 may help to prevent access to the interior of stack of tires 63 to prevent the tires from deteriorating due to harsh weather conditions. Additionally, protective tire device 10 helps to prevent animals living and breeding within the tires at the inner liners thereof. Protective tire device 10 helps to extend the lifespan of tires during storage.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a protective tire device, comprising:
   a) a cover assembly including a cover, said cover including a plurality of through holes equidistantly located about a circumference of the cover;
   b) a strap assembly including a plurality of straps, each of said plurality of straps received within one of said plurality of through holes and hanging therefrom, wherein each of said plurality of straps include a hook at a distal end thereof; and
   c) a tire assembly including stacked tires, said stacked tires including a top tire, said cover detachably secured to said top tire with said plurality of straps, said cover preventing access to an interior of said stacked tires for preservation thereof, wherein each of said hook secures each of said plurality of straps to said stacked tires, wherein said hook engages an inner liner of said top tire from underneath to secure said plurality of straps to said stacked tires wherein said plurality of straps are sandwiched between tires of said stacked tires when said hook of each of said plurality of straps are secured to said inner liner.

2. The system of claim 1, wherein said cover is dome shaped.

3. The system of claim 1, wherein said cover assembly further includes a plurality of O-rings, each of said plurality of through holes reinforces by one of said plurality of O-rings which extend about a circumference of each of said plurality of through holes.

4. The system of claim 1, wherein said plurality of straps are elastomeric straps.

5. The system of claim 1, wherein each of said plurality of straps includes a securing loop at a top end thereof, said securing loop secured to each of said plurality of through holes in constant abutting contact therewith.

6. The system of claim 1, wherein said plurality of straps are parallel to each other.

7. The system of claim 1, wherein said plurality of straps are in constant abutting contact with said stacked tires.

8. The system of claim 1, wherein said cover partially conceals said top tire.

9. The system of claim 1, wherein said cover has a width greater than said top tire.

* * * * *